(12) United States Patent
Tormaschy et al.

(10) Patent No.: US 7,641,792 B2
(45) Date of Patent: Jan. 5, 2010

(54) WATER CIRCULATION SYSTEMS FOR PONDS, LAKES, MUNICIPAL TANKS, AND OTHER BODIES OF WATER

(75) Inventors: Willard R. Tormaschy, Dickinson, ND (US); Gary A. Kudrna, Dickinson, ND (US); Corey M. Simnioniw, Dickinson, ND (US); Joel J. Bleth, Dickinson, ND (US); Jonathan L. Zent, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 0 days.

(21) Appl. No.: 12/361,102

(22) Filed: Jan. 28, 2009

(65) Prior Publication Data

US 2009/0134083 A1 May 28, 2009

Related U.S. Application Data

(62) Division of application No. 11/733,009, filed on Apr. 9, 2007, now Pat. No. 7,517,460.

(60) Provisional application No. 60/791,091, filed on Apr. 10, 2006.

(51) Int. Cl.
*B01D 15/00* (2006.01)
*B01J 20/00* (2006.01)

(52) U.S. Cl. .................. 210/198.1; 210/205; 210/242.1; 210/416.1

(58) Field of Classification Search ............ 210/198.1, 210/242.1, 205, 416.1
See application file for complete search history.

(56) References Cited

U.S. PATENT DOCUMENTS

| | | | |
|---|---|---|---|
| 1,530,326 A | 3/1925 | Prindle | |
| 2,827,268 A | 3/1958 | Staaf | |
| 3,204,768 A | 9/1965 | Daniel | |
| 3,512,375 A | 5/1970 | Madarasz et al. | |
| 3,794,303 A | 2/1974 | Hirshon | |
| 3,837,309 A | 9/1974 | Biewer | |
| 3,856,272 A | 12/1974 | Ravitts | |
| 4,030,859 A | 6/1977 | Henegar | |
| 4,179,243 A | 12/1979 | Aide | |
| 4,764,313 A | 8/1988 | Cameron et al. | |

(Continued)

FOREIGN PATENT DOCUMENTS

CA  1 262 052  10/1989

(Continued)

*Primary Examiner*—Matthew O Savage
*Assistant Examiner*—Paul J Durand
(74) *Attorney, Agent, or Firm*—W. Scott Carson

(57) ABSTRACT

A circulation system for bodies of water. In one set of embodiments for larger bodies of water, modified horizontal plate designs are provided at the entrance of the draft hose. The plate designs have sections that pivot downwardly as the flotation platform and depending draft hose are rapidly raised in high wave conditions to let the water escape downwardly out of the hose. Adaptations to the floats for the elongated arms of the platform are also made to essentially eliminate the creation of any damaging torques on them from high waves. Another set of embodiments are particularly adapted for smaller systems in municipal water tanks for thorough mixing of the water and treatment to kill undesirable ammonia oxidizing bacteria and prevent or at least inhibit their return.

15 Claims, 14 Drawing Sheets

U.S. PATENT DOCUMENTS

| | | |
|---|---|---|
| 5,021,154 A | 6/1991 | Haegeman |
| 5,122,266 A | 6/1992 | Kent |
| 6,273,402 B1 | 8/2001 | Cheng |
| 6,432,302 B1 | 8/2002 | Obritsch |
| 6,439,853 B2 | 8/2002 | Tormaschy |
| 6,811,710 B2 | 11/2004 | Simmons |
| 6,818,124 B1 | 11/2004 | Simmons |
| 7,052,614 B2 | 5/2006 | Barak |
| 7,285,208 B2 | 10/2007 | Tormaschy et al. |
| 7,306,719 B2 | 12/2007 | Tormaschy et al. |
| 7,332,074 B2 | 2/2008 | Tormaschy et al. |
| 2005/0061721 A1 | 3/2005 | Tormaschy et al. |

FOREIGN PATENT DOCUMENTS

| | | |
|---|---|---|
| JP | 11047794 | 2/1999 |

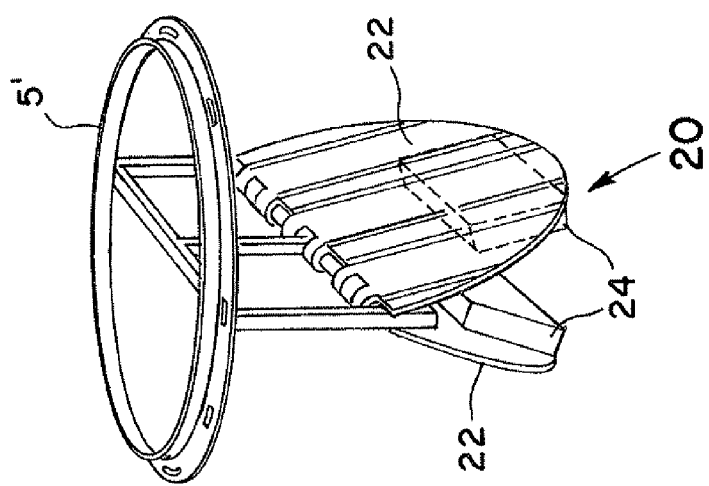
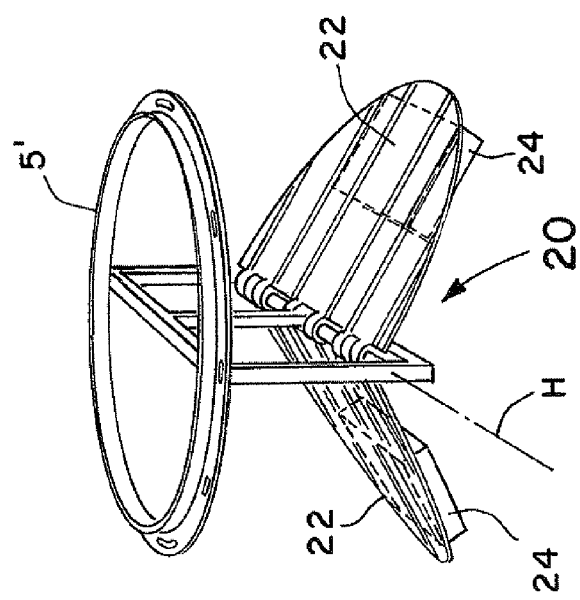
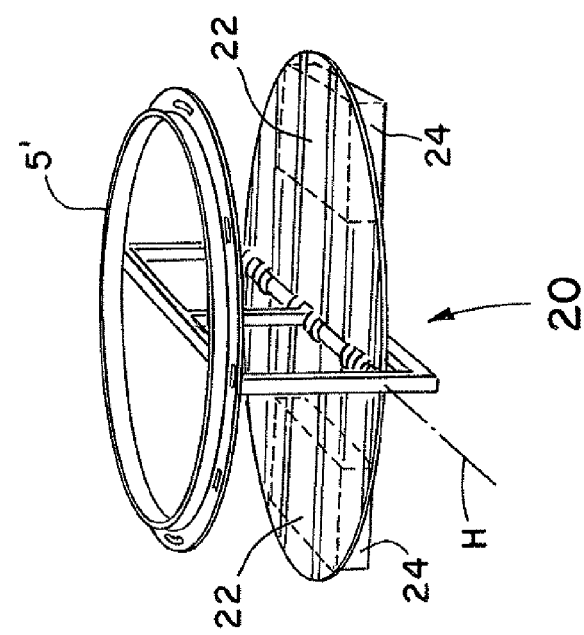

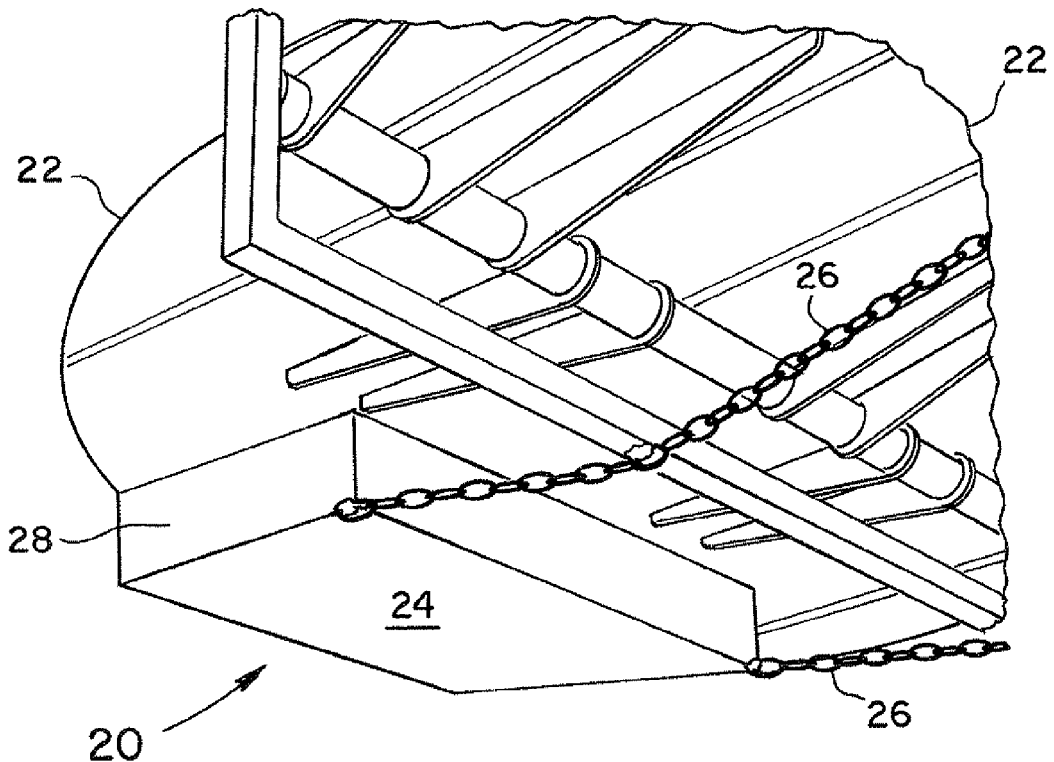
*Fig.10*
*Fig.11*
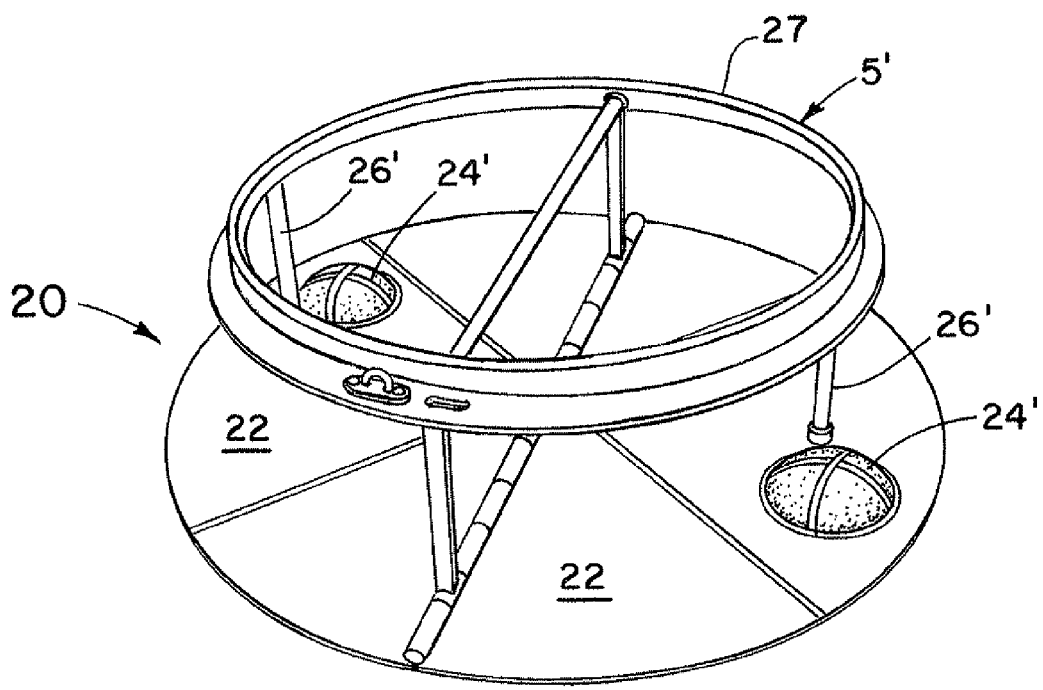

Fig. 19
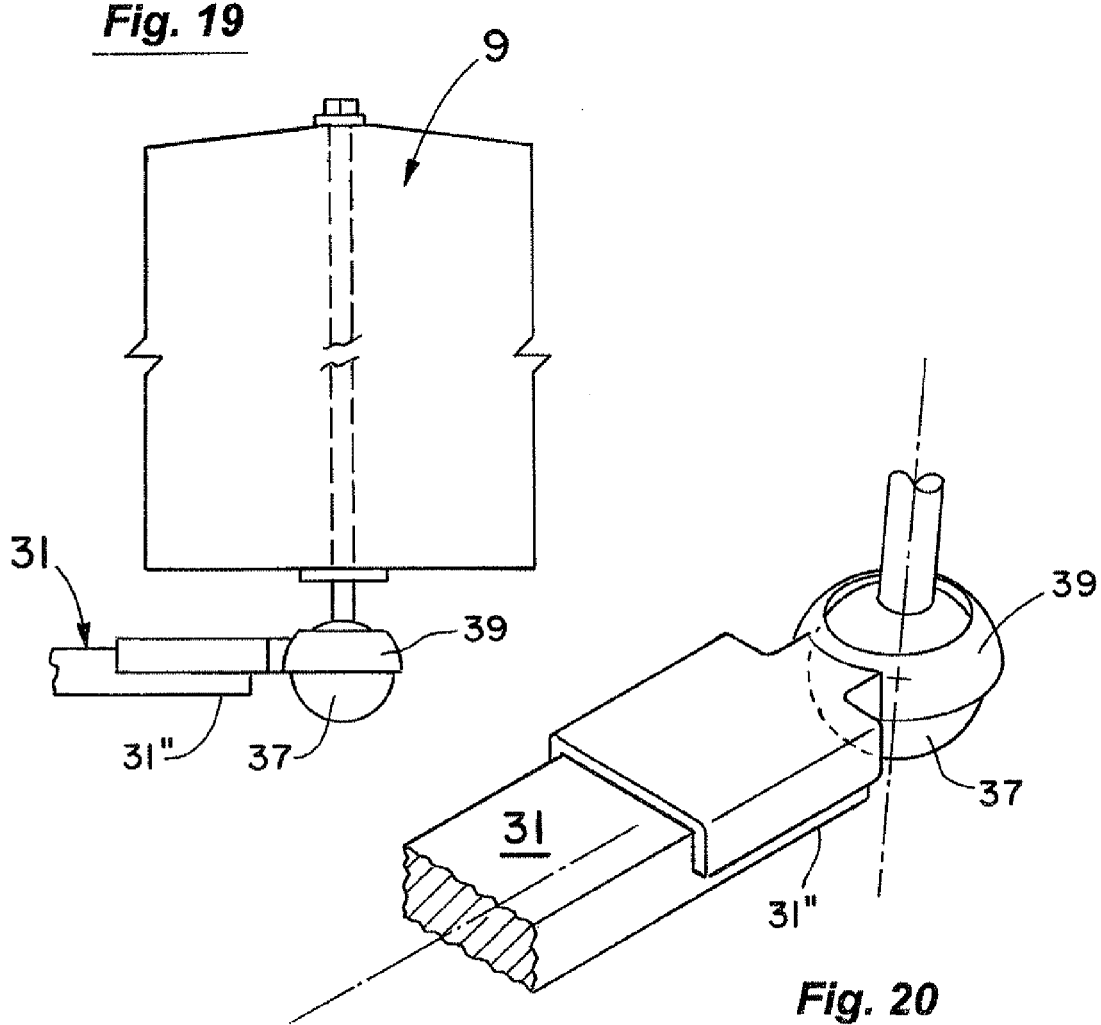
Fig. 20
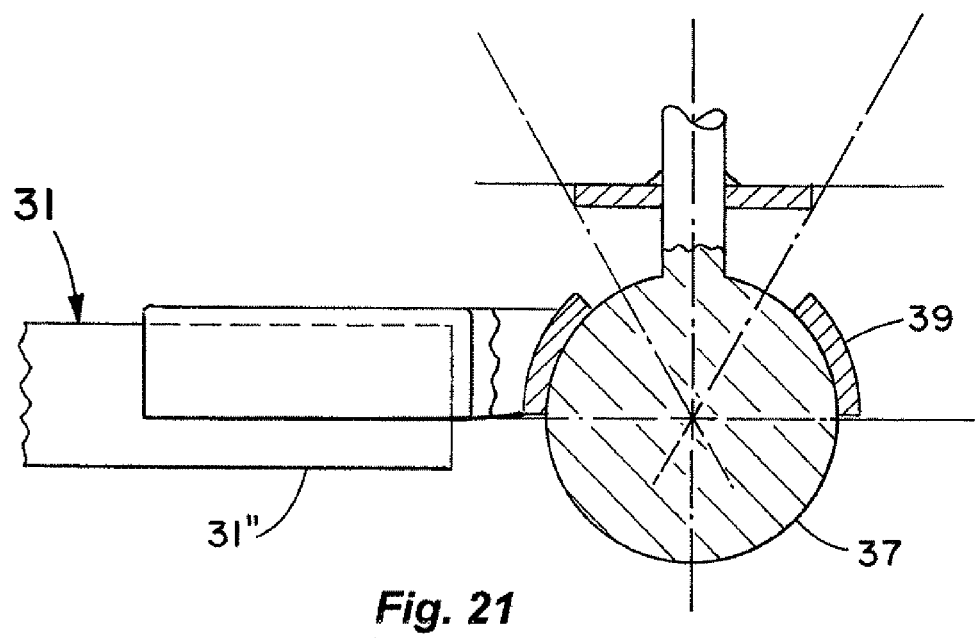
Fig. 21

WATER CIRCULATION SYSTEMS FOR PONDS, LAKES, MUNICIPAL TANKS, AND OTHER BODIES OF WATER

RELATED APPLICATIONS

This application is a division of U.S. patent application Ser. No. 11/733,009 filed Apr. 9, 2007, now U.S. Pat. No. 7,517,460, which claims the benefit of U.S. Provisional Patent Application Ser. No. 60/791,091 filed Apr. 10, 2006, which applications are incorporated herein by reference.

BACKGROUND OF THE INVENTION

1. Field of the Invention

This invention relates to the field of circulation systems for ponds, lakes, municipal tanks, and other bodies of water. It particularly relates to the field of such circulation systems for relatively large and deep bodies of water in which high waves may periodically develop. It also relates to circulation systems for smaller and shallower bodies of water such as in municipal or similar water tanks and containers.

2. Discussion of the Background

One group of improvements of the present invention has particular application to larger and deeper bodies of water that may develop large waves (e.g., 4-6 feet high or more). Circulation systems for such bodies that float on the surface of the water must then rise vertically the height of each wave and often must do so very quickly (e.g., within a few seconds or less). Typical circulation systems have a draft hose attached to a flotation platform floating on the surface. The hose extends downwardly (e.g., 20-50 feet or more) into the body of water and can have a diameter on the order of 3 feet. In operation, such circulation systems are drawing a large volume of water up the draft hose and as the flotation platform rises with each wave, the attached draft hose must also rise with it.

In many such circulation systems, it is desirable to control the direction and level of the water being drawn into the bottom of the draft hose by providing a horizontal plate or other structure adjacent the inlet to the hose. However, a problem can occur that the large volume of water in the hose cannot quickly escape back out of the restricted bottom or inlet of the hose as it is lifted with a wave. Consequently, great stresses are put on the flotation platform and hose of the system as the flotation platform rises with each wave and attempts to pull up with it the very heavy hose full of water. In extreme cases, the stresses can damage or even destroy the flotation platform as well as the hose and other parts of the system. As indicated above, the primary cause of the problem in such systems is that the column of water in the hose cannot escape fast enough out the restricted bottom of the hose, particularly in high seas with waves cresting at 4-6 feet or more every few second or so.

Larger and deeper bodies of water which may develop high and violent waves can also present problems to the float arrangements for such circulation systems. That is, many systems have floats that are essentially rigidly attached to elongated arms extending outwardly of the central platform of the system. The floats commonly extend downwardly from the ends of the arms and serve to suspend or support the platform via its arms on the surface of the water. Under normal conditions with gentle waves, such float arrangements work fine as there is enough time for the water to move around the floats without exerting any large side forces on the arms. However, when high winds or other elements develop, the waves can become quite high and violent. In these situations, there can be large forces exerted on the floats from the water pushing against them. The side forces on the floats then translate into a twisting force or torque on the elongated arms fixedly attached to them and the platform. This twisting of the float arms can eventually fatigue them to the point of failure. In extreme cases, the side forces may even snap or otherwise damage the arms so they do not support the platform properly atop the water.

Other improvements of the present invention have particular applications to municipal drinking and similar tanks of water. Such tanks or other containers for potable water have special needs and requirements. For example, it is desirable that all of the water in the tank be thoroughly or uniformly mixed so there are essentially no dead spots, including in any corners and along the walls and floor of the tank. Such mixing is preferably accomplished relatively quickly by the circulation system and maintained so over extended periods of operation. It is also desirable that the circulation system be designed to easily and quickly inject disinfectants such as chlorine and chloramines into the circulating water.

With these and other problems and desired characteristics in mind, the adaptations of the present inventions were developed.

SUMMARY OF THE INVENTION

The present invention involves improvements in various aspects of circulation systems for ponds, lakes, municipal tanks, and other bodies of water.

In one set of improvements, modified horizontal plate designs are provided at the entrance of the draft hose that depends from the flotation platform into the depths of the body of water. In a first design, the plate member has two sections pivotally mounted to each other. The two sections are biased by floats to align horizontally with each other when the body of water is relatively calm. The horizontally extending plate sections are adjacent the bottom of the hose and serve to direct the incoming water substantially horizontally into the hose. In this manner, the plate with its sections extending horizontally essentially controls or limits the depth of the water being drawn into the hose.

In adverse conditions with high waves, the plate sections can desirably fold or collapse downwardly toward each other and a vertical plane as the flotation platform and attached hose are lifted up with the wave. In this regard, the water escaping out the bottom of the rapidly rising hose will overcome the upward forces of the floats on the plate sections and will collapse the sections toward each other. In extreme conditions, the force of the escaping water will fold the plate sections together to extend substantially adjacent one another in a vertical plane. In doing so, the plate sections in the fully open or folded position offer little if any resistance to the column of water escaping out of the bottom of the hose as the hose is being lifted with the wave. Stresses and damage to the flotation platform, hose, and other parts of the circulation system are thus minimized in high wave conditions.

In a second design, the plate member has a number of pie-shaped or triangular-shaped sections pivotally mounted at their bases to a surrounding circular ring. In contrast to the first design, the triangular-shaped sections fold or collapse downwardly away from each other rather than toward each other as the flotation platform and attached hose are lifted up with the wave. Otherwise, the first and second plate designs operate substantially in the same manner to achieve essentially the same desired result.

Another aspect of the present inventions for bodies of water that may develop large and violent waves includes adaptations to the floats for the elongated arms of the platform. In this regard, the floats are mounted to the ends of the arms so as to be substantially free to move essentially universally relative to the arms. The floats extend above rather than below the ends of the arms and are connected by flexible arrangements such as chains, cables, ropes, and ball joints. Violent waves or forces in the water can then press sideways against and move the floats without creating damaging forces or torques on the arms.

Still other improvements of the present invention serve to particularly adapt the circulation system to municipal and similar tanks or containers for drinking or potable water. Such systems have specific needs and requirements. Among them, the system needs to thoroughly mix the water in a relatively quick and sustainable manner to reach all areas of the tank. The system also needs to be able to inject disinfectants in an efficient and relatively quick manner. In the present invention, the inlet arrangement to the draft hose has been designed to draw water uniformly in essentially all directions (360 degrees) across the bottom or floor of the tank into the draft hose. This aids in a thorough mixing of the water as well as disinfecting of the water and surfaces of the tank including its walls and floor. The system has particular application in municipal water tanks disinfecting with chloramines, which can develop films of undesirable ammonia oxidizing bacteria on the surfaces of the walls and floors. The thorough circulation pattern of the present system in this regard produces flow along and against the tank walls and floor to effectively bring the chlorine in the chloramines into contact with the undesirable surface bacteria to kill them and prevent or at least inhibit their return.

BRIEF DESCRIPTION OF THE DRAWINGS

FIGS. 5-7 further illustrate the operation of the modified flap valve plate in the sequential operation of FIGS. 2-4.

FIGS. 9 and 10 are views looking upwardly from beneath the modified flap valve plate showing it in its substantially horizontal position of FIGS. 1, 2, and 5.

FIG. 11 illustrates another embodiment of the modified flap valve plate of the present invention with a different arrangement of floats.

FIGS. 19-21 illustrate another flexible arrangement for attaching the floats of FIG. 16 to the outer end portions of the float arms to also avoid creating damaging twisting or torque forces on the arms.

DETAILED DESCRIPTION OF THE INVENTION

Figure 1:
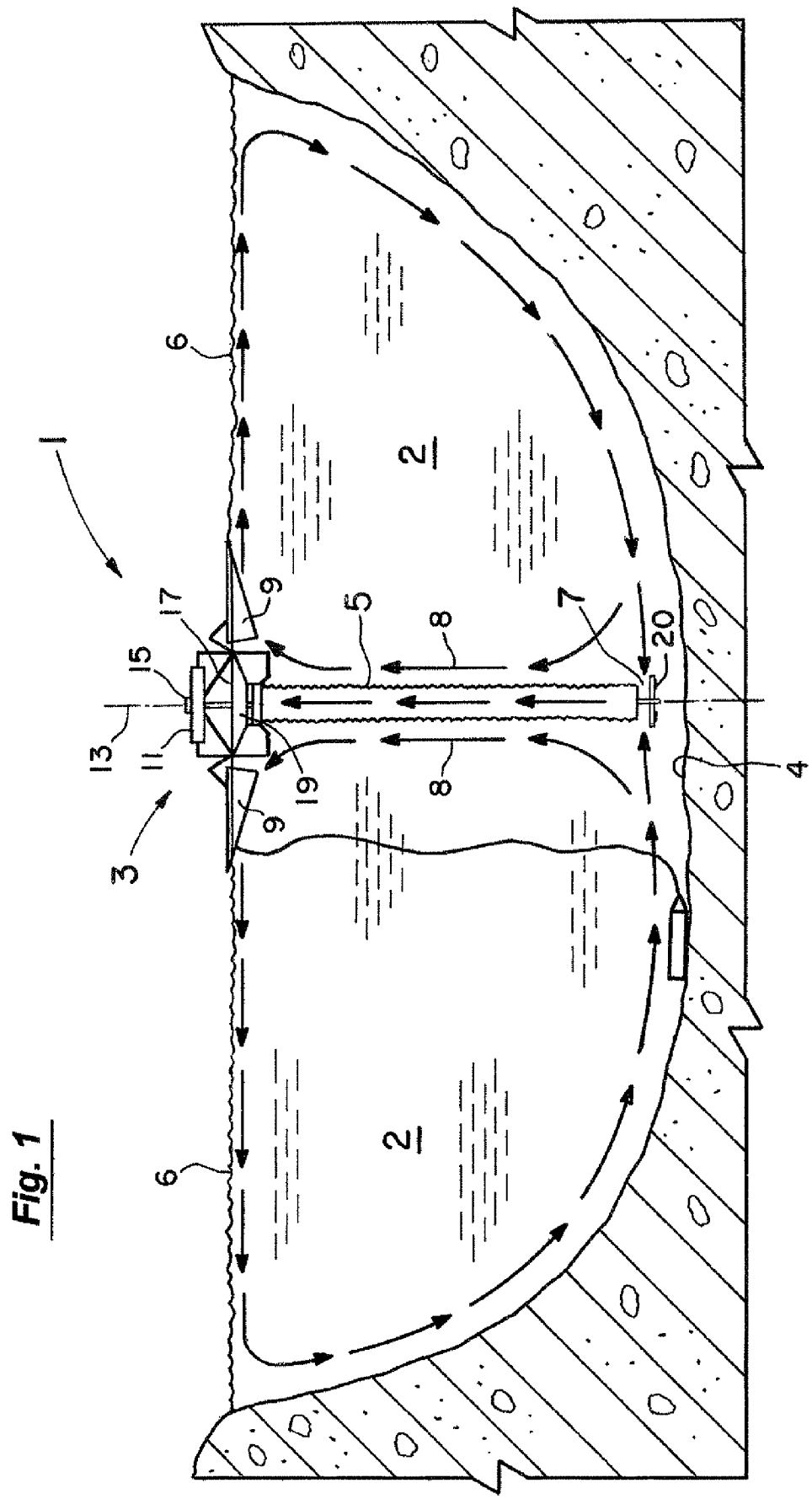
FIG. 1 is a cross-sectional view of a circulation system for a relatively large body of water such as a pond or lake in which the system creates an overall flow pattern in the body of water out to its edges and down to its depths.
Figure 3:
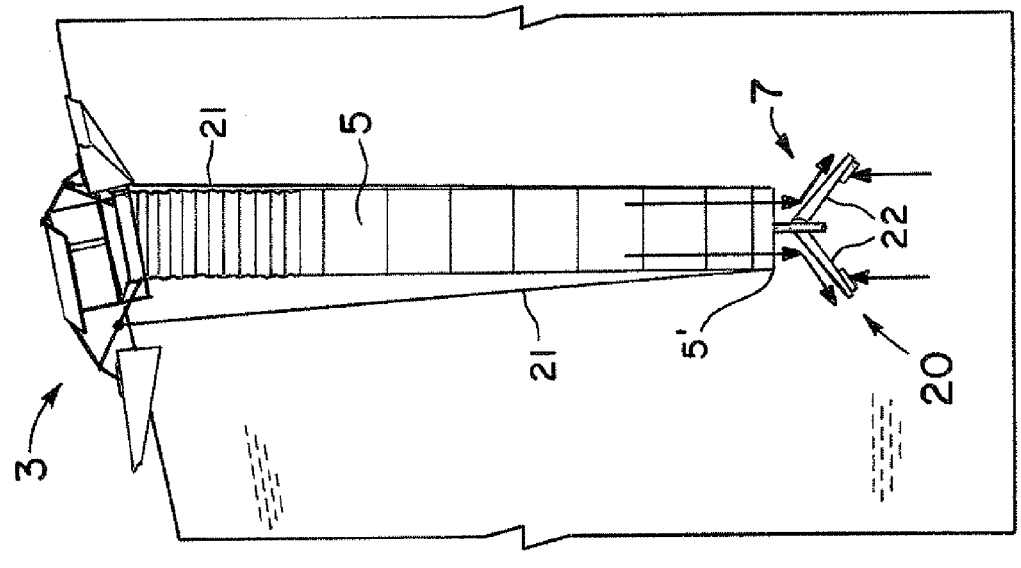

As schematically shown in FIG. 1, the water circulation system 1 of the present invention for large bodies of water such as a pond or lake 2 includes an upper flotation platform or floating portion 3 with a draft hose or tube 5 depending downwardly from the platform 3 toward the lake bottom 4 to the water inlet 7 to the hose 5. The flotation platform 3 includes a plurality of floats 9 (e.g., three) supported thereon. The floats 9 extend outwardly of the central axis 13 (FIG. 1) of the platform 3 and are preferably evenly spaced thereabout. The floats 9 extend far enough out from the central axis 13 to provide a relatively stable and buoyant support structure for the system 1 including its solar panels 11, electric motor 15, dish 17, and impeller at 19 as well as for the depending draft hose 5 and the structure of the water inlet 7. One or more cables or lines 21 as in FIGS. 2-4 can also be provided to extend from the flotation platform 3 down to the bottom portion 5' of the hose 5.

Figure 2:
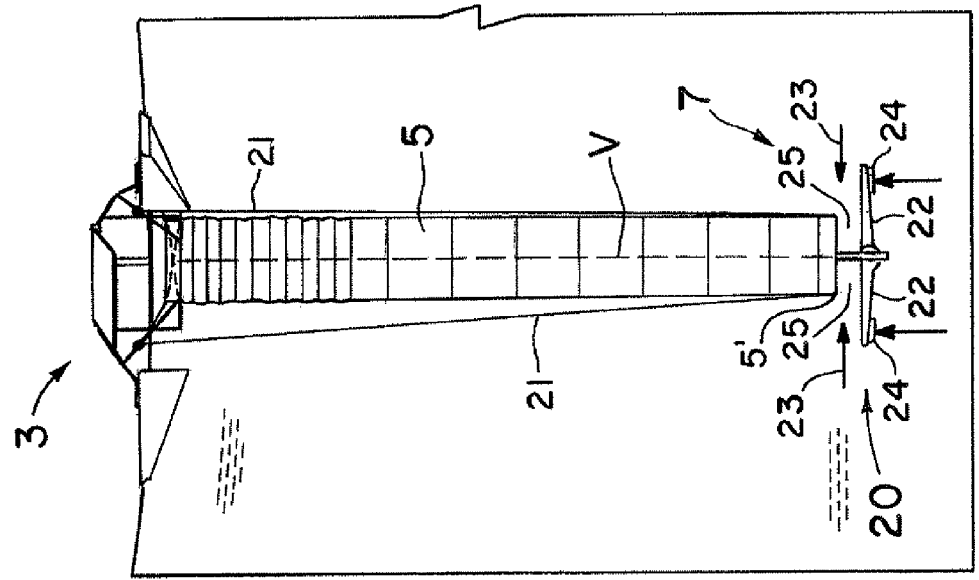

In operation as best seen in FIG. 1, water is drawn up through the hose 5 to the surface 6 by the impeller at 19 on the flotation platform 3. The draw of the impeller 19 up the hose 5 also induces the additional flow 8 along the outside of the draft tube 5 aiding to create the overall flow pattern of the system 1. To limit or control the direction 23 (see FIG. 2) of the flow of water into the bottom portion 5' of the hose 5 and into the surrounding induced flow 8 of FIG. 1, a substantially horizontally extending plate member 20 is supported adjacent the inlet opening 7 to the hose 5. The inlet opening 7 as shown in FIG. 2 is actually formed by the gap or opening 25 between the bottom portion 5' of the hose 5 and the plate member 20 spaced below it. The plate member 20 extends substantially about and outwardly of the vertical axis V (FIG. 2). The inlet opening 7 in turn preferably extends along and about the axis V. The horizontally extending plate member 20 of FIG. 2 in this regard substantially prevents the circulation system 1 from drawing in water below the level of the plate member 20. The plate member 20 also aids in establishing the overall circulation in the body of water 2 of FIG. 1 passing laterally above the plate member 20 into and up the hose 5, outwardly of the flotation platform 3, downwardly into the body of water, and again laterally into the hose 5.

Figure 4:
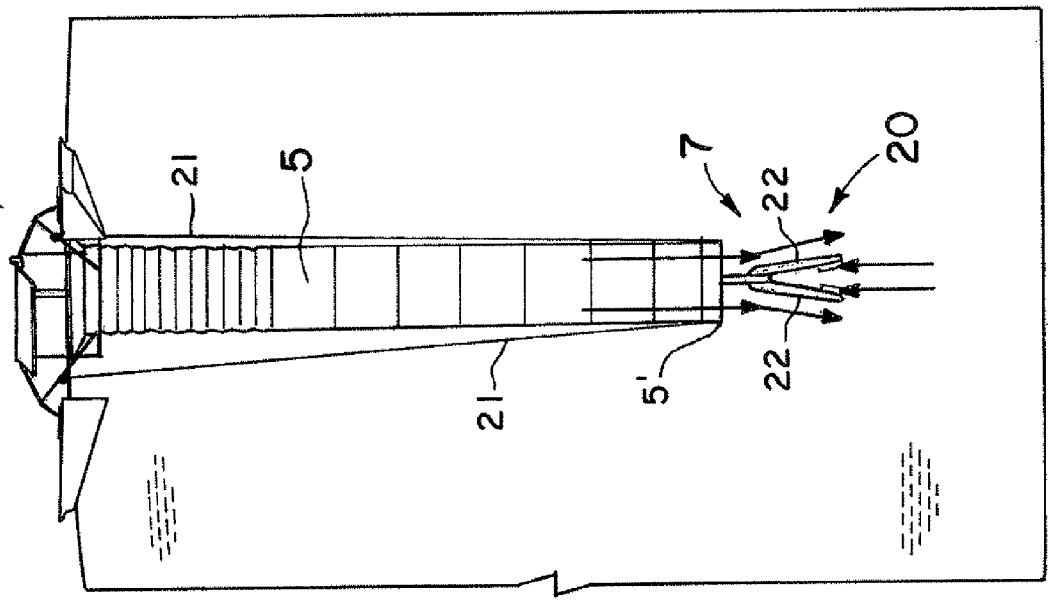
FIGS. 2-4 schematically illustrate the sequential operation of the modified flap valve plate of FIG. 1 which essentially collapses as the flotation platform and attached draft hose are lifted by a wave.

In high wave conditions with the flotation platform 3 being raised 4-6 feet or more every few seconds or less, the flotation platform 3 and attached hose 5 can be rapidly and often violently lifted from the position of FIG. 2 to that of FIG. 4. To prevent the horizontal plate member 20 from unduly restricting or limiting the escape of water out of bottom portion 5' of the hose 5, the plate member 20 is designed with two sections 22 pivotally mounted to each other. Consequently, as the flotation platform 3 and attached hose 5 are raised (see FIGS. 3-4), the plate member 20 essentially folds or collapses with the sections 22 being pivoted downwardly toward each other. With the sections 22 substantially adjacent one another in the open position of FIG. 4, little if any resistance is offered to the column of water escaping out the bottom portion 5' of the hose 5. Stresses are then greatly reduced on the flotation platform 3 and attached hose 5 as well as other parts of the circulation system 1.

Figure 8:
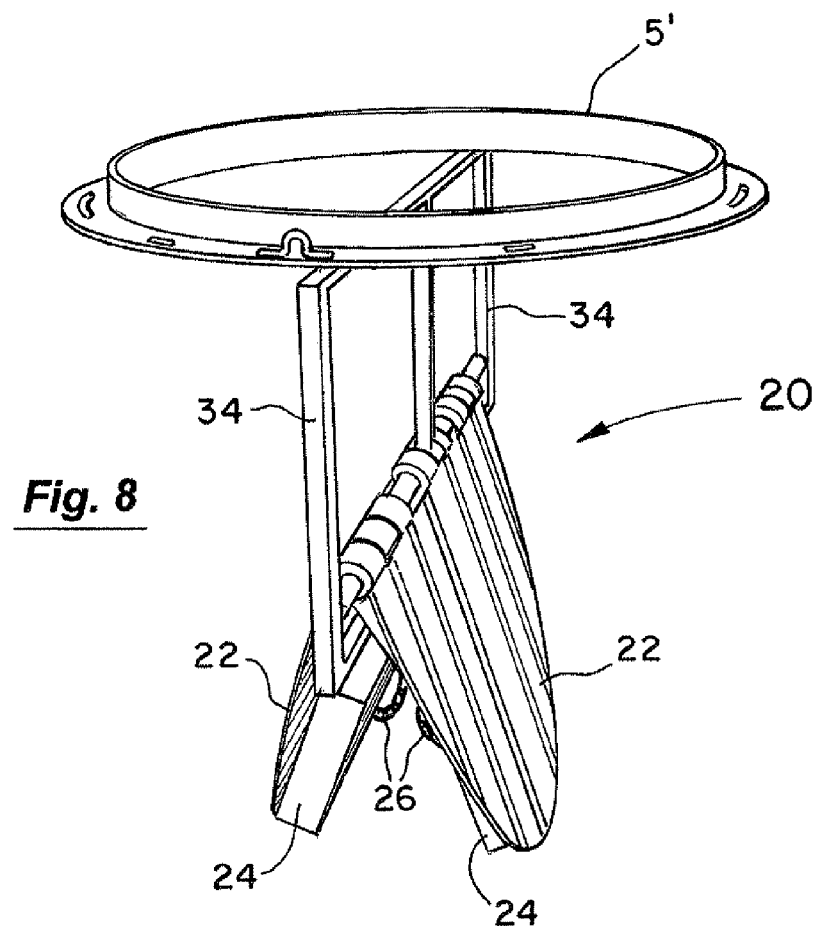
FIG. 8 shows the modified flap valve plate with its two sections pivoted downwardly to the fully open position.
Figure 9:
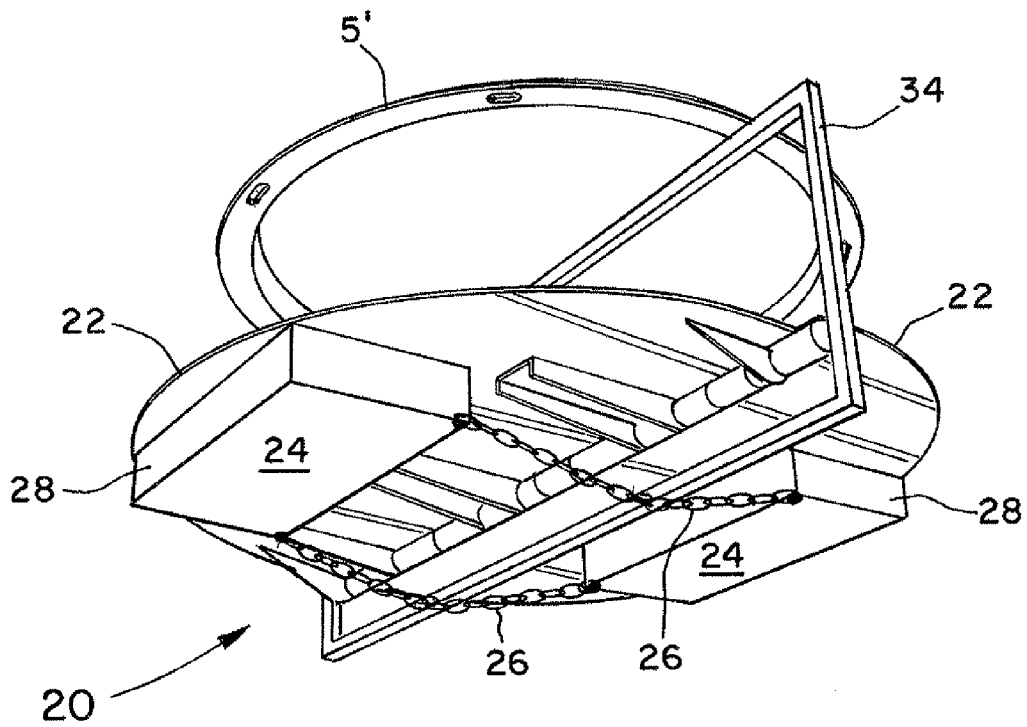

FIGS. 5-7 are further views of the operation of the pivoting flap valve 20. As shown and as the flotation platform 3 and hose 5 are being raised by the wave of FIGS. 2-4, the valve plate sections 22 are moved from their normal horizontal position (FIG. 5) downwardly toward each other about the common horizontal axis H (FIG. 6) and eventually to their fully open position of FIG. 7. The fully open position is also shown in FIG. 8. In being moved to the fully open position, the forces of the floats 24 that bias or raise the plate sections 22 to the horizontal position of FIGS. 2 and 5 are overcome by the force of the water column escaping out the bottom portion 5' of the hose 5. As perhaps best seen in FIGS. 9 and 10 looking upwardly from beneath the plate 20, one or more chains 26 or other restraining mechanism is preferably provided. The chains 26 serve to limit the upward extent to which the sections 22 (FIG. 9) can pivot away from the fully open position and each other. In this manner, the sections 22 are prevented from going beyond the horizontal position of FIGS. 2 and 5. The chains 26 of FIG. 9 are affixed to each section 22 and extend substantially along horizontal axes with the sections in the position of FIGS. 9 and 10. The floats 24 in this regard can be any buoyant material (e.g., closed-cell polystyrene) and are preferably placed within protective housings such as the stainless steel ones 28 of FIGS. 9 and 10. Other float arrangements such as the ball-shaped floats 24' in FIG. 11 could also be used if desired. In this arrangement, the upward movement of the sections 22 beyond the horizontal is restrained by the elongated members or legs 26'. The legs 26' as shown extend downwardly from the circular ring 27 of the draft hose bottom portion 5' to abut and prevent the sections 22 from moving upwardly beyond the horizontal.

Another embodiment 20' of the plate member or flap valve is illustrated in FIGS. 12-15. As shown, the plate member 20' includes a plurality of pie-shaped or triangular-shaped sections 22'. The base of each triangular sections 22' is mounted (e.g., by hinges 30 on the underside of the circular ring 32 as in FIG. 15) for pivotal movement about the respective horizontal axes H'. Adjacent sections 22' then pivot about adjacent axes H' (FIGS. 12 and 15) that intersect one another. The sections 22' have floats 24 and can be restrained from moving upwardly beyond the horizontal position of FIG. 12 or downwardly away from each other beyond the open position of FIG. 14 by the hinges 30 or bases of the sections 22' abutting the ring 32 or by other restraining mechanisms. The ring 32 in turn would be supported below the bottom hose portion 5' of FIG. 8 by the legs 34 or other structure.

Figure 12:
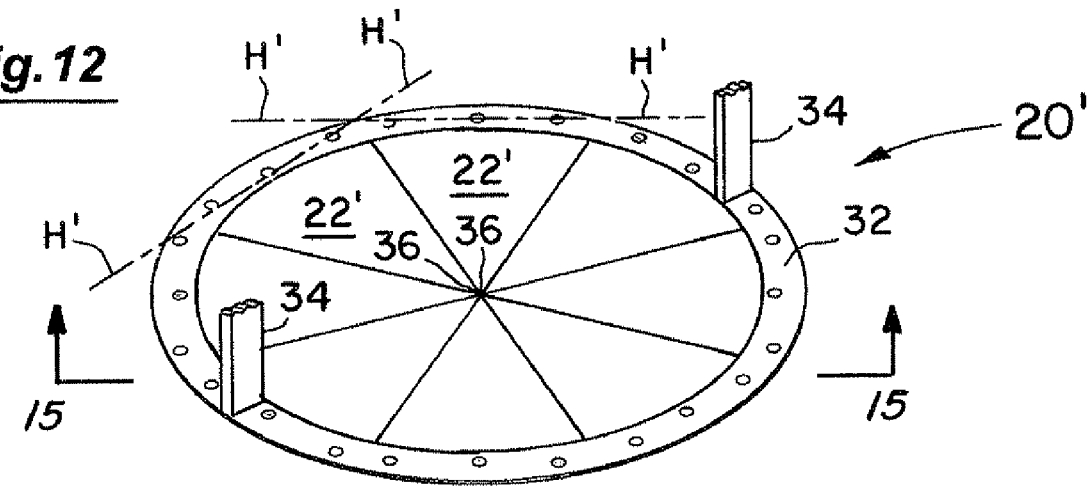
FIGS. 12-15 show an additional embodiment of the flap valve plate in which the plate has a plurality of triangular-shaped sections pivotally mounted to a circular ring for pivotal movement downwardly and away from each other rather than toward each other as in the earlier embodiments.
Figure 13:
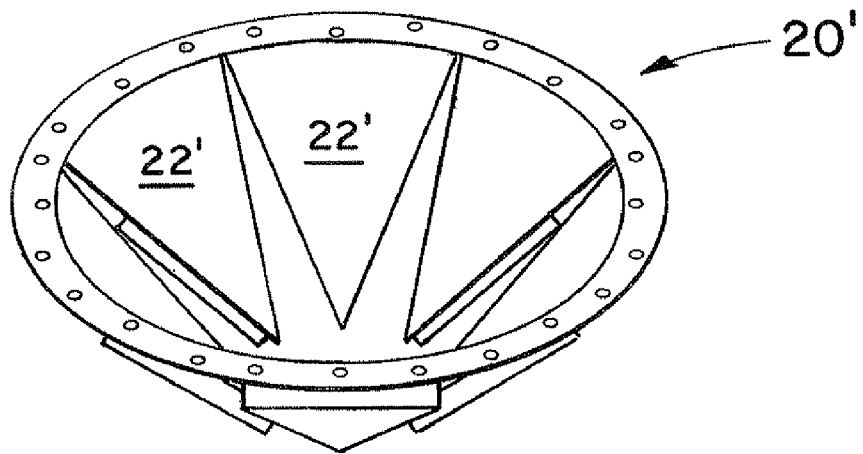
Figure 14:
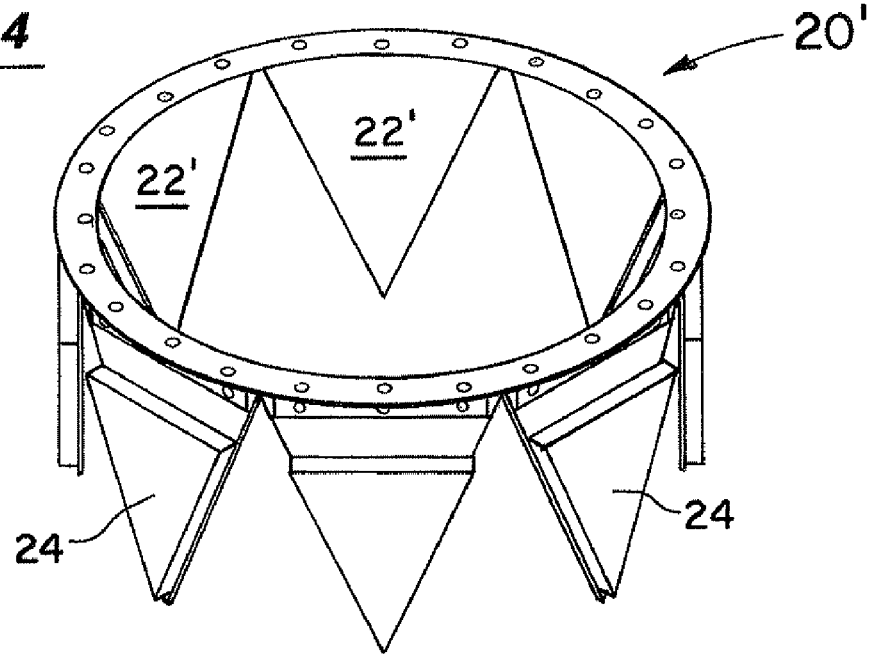
Figure 15:
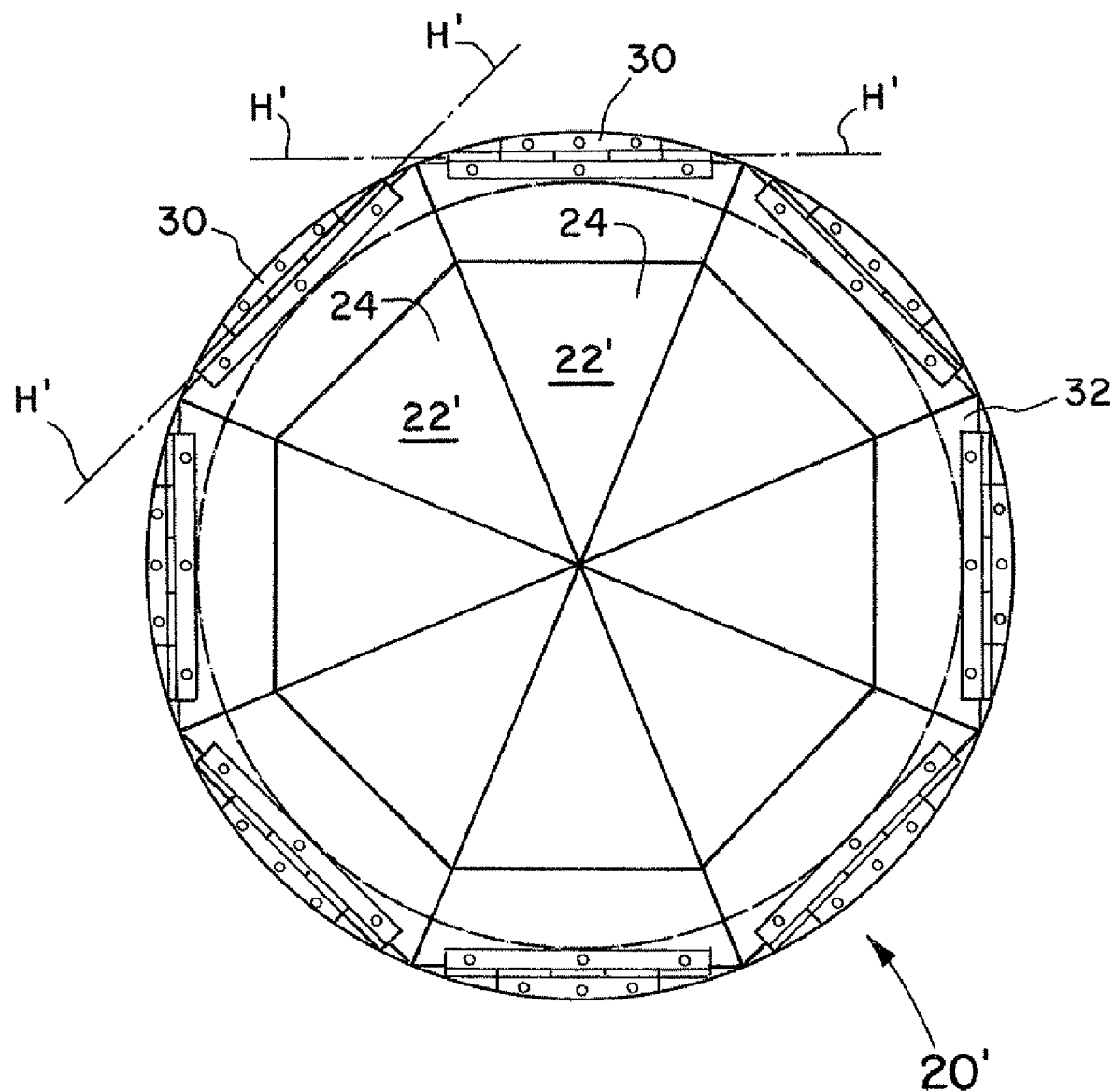

In operation as illustrated, the sections 22' of the plate member 20' can be pivotally moved about their respective axes H' from the horizontal position of FIG. 12 (with the apexes 36 of the triangular sections 22' adjacent one another) to the open position of FIG. 14. In contrast to the first embodiment 20 of FIGS. 1-11, the triangular-shaped sections 22' of the embodiment 20' of FIGS. 12-15 fold or collapse downwardly away from each other rather than toward one another as the flotation platform 3 and attached draft hose 5 are lifted up with the wave as in FIGS. 2-4. Otherwise, the first and second plate embodiments 20 and 20' operate substantially in the same manner to achieve essentially the same desired result.

Figure 16:
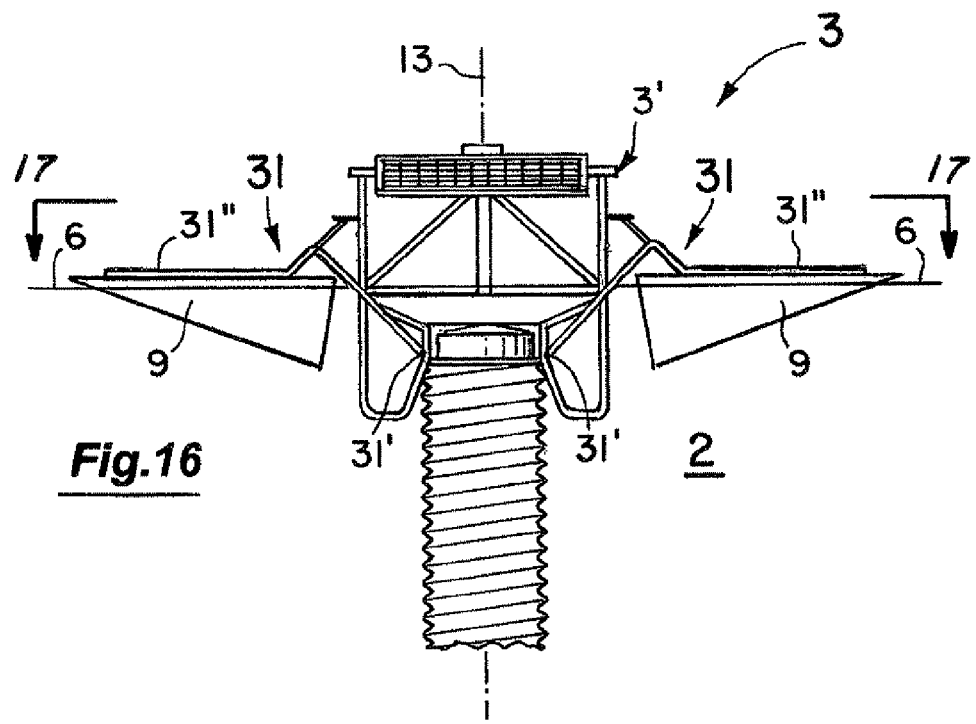
FIG. 16 is a side view of the float arrangement of FIG. 1 in which the float arms extend above the surface of the water and the floats are fixedly attached beneath them.
Figure 17:
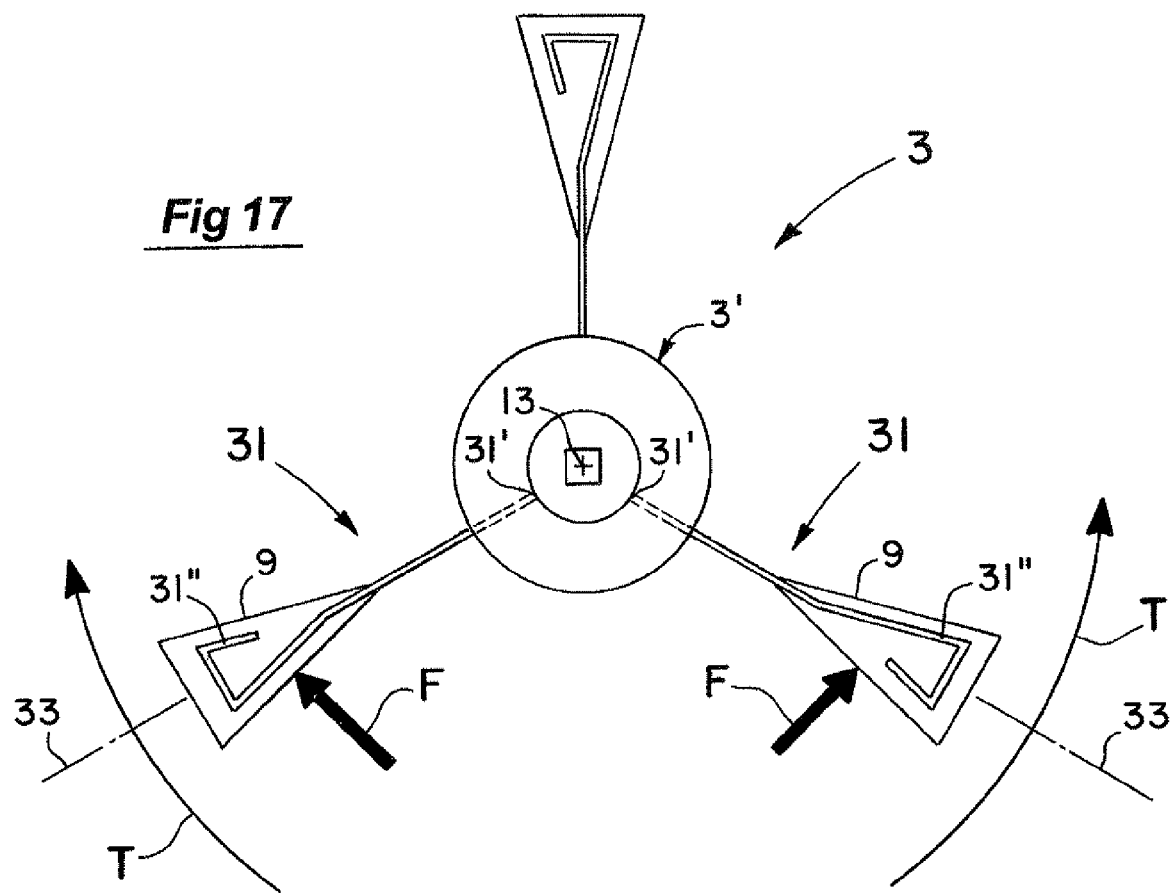
FIG. 17 is a view taken along line 17-17 of FIG. 16.

Another problem that can occur with circulation systems 1 on large bodies of water 2 that can develop high and violent waves is fatigue and damage to the flotation arms. That is, designs such as in FIG. 1 commonly have elongated arms such as 31 in FIGS. 16 and 17 that extend outwardly of the central section 3' of the flotation platform 3 and its vertical axis 13. The arms 31 are elongated along axes 33 (FIG. 17) and extend outwardly above the floats 9 (FIG. 16). Each arm 31 has an inner end portion 31' attached (e.g., by a horizontal pivot) to the central section 3' of the flotation platform 3 with the float 9 then attached to and beneath the outer end portion 31". In this manner, each arm 31 is positioned above the float 9 and above the surface 6 of the body of water 2.

Under normal conditions with gentle waves, these arrangements work fine as there is enough time for the water to move around the floats 9 and no large side forces are exerted on the floats 9. However, when high and violent waves develop, large and rapid forces F (FIG. 17) in the waves can push essentially sideways or horizontally against the floats 9. These horizontal forces then translate into twisting or torque forces T on the float arms 31 about the central section 3' of the flotation platform 3 and its vertical axis 13. Eventually, the torque forces T fatigue the arms 31 to the point the arms 31 may break or otherwise fail, particularly at the attachment to the central section 3' of the flotation platform 3.

Figure 18:
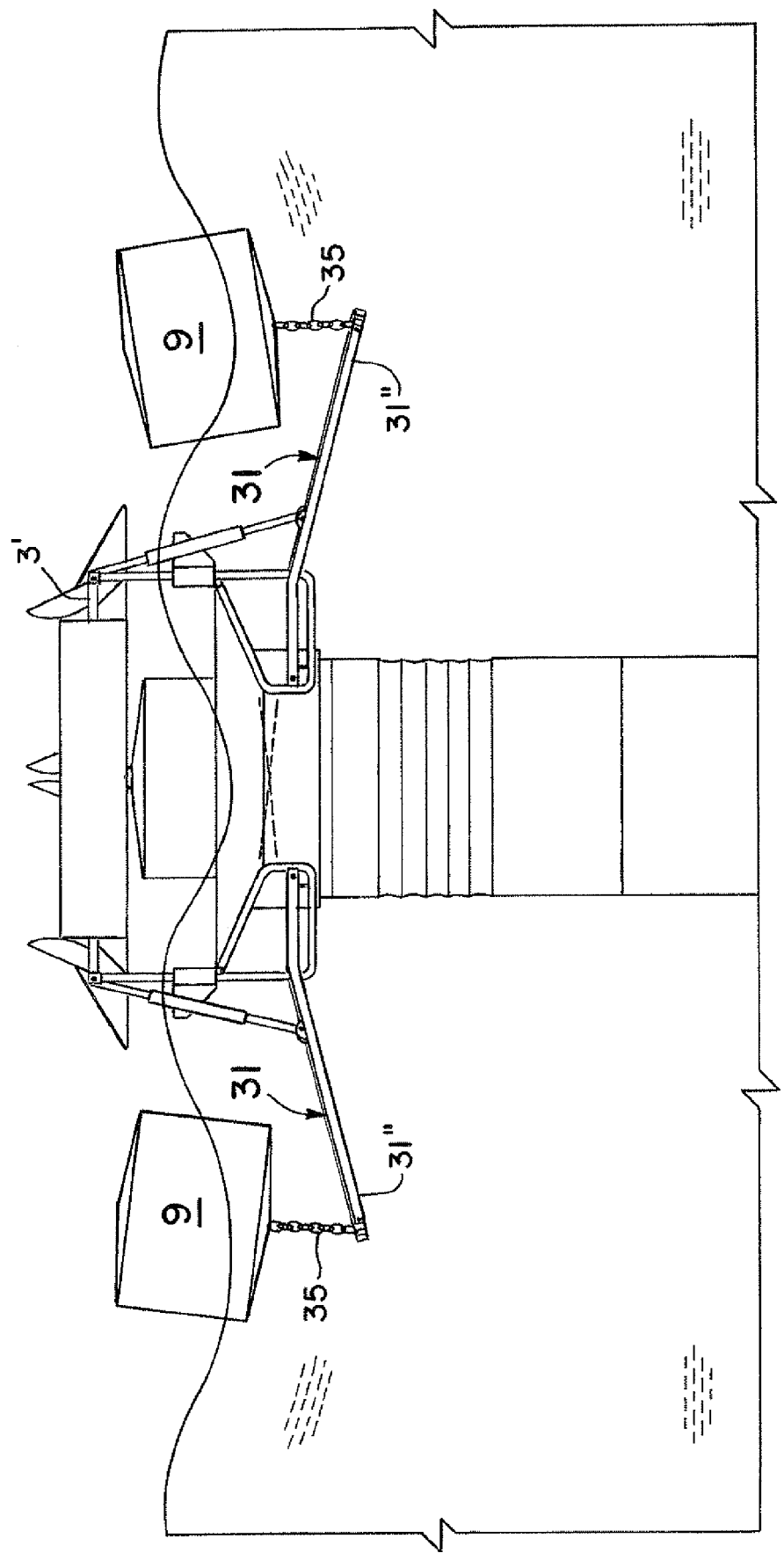
FIG. 18 is a view of an adaptation of the circulation system of FIG. 16 in which the float arms extend outwardly under the surface of the water versus the ones of FIG. 16 and the floats are positioned above the arms by flexible members such as chains to avoid creating damaging twisting or torque forces on the arms as can occur with the arrangement of FIGS. 16 and 17.

To overcome this problem, the arrangement of FIG. 18 was developed. In it, the elongated arms 31 extend as before outwardly of the central section 3' of the flotation platform 3 but do so with the outer end portions 31", below rather than above the water surface 6. The floats 9 in turn are positioned above rather than below the outer end portions 31" of the arms 31 and are connected by flexible arrangements such as ropes, cables, or the illustrated chains 35 of FIG. 18. In this manner, the floats 9 are substantially free to move essentially universally relative to the arms 31. Violent waves or forces in the water can then press sideways against and move the floats 9 without creating damaging forces or torques on the arms 31. Additionally, the central section 3' of the flotation platform 3 remains more stable in such high wave conditions as the central section 3' is moved about much less regardless of the direction the waves push against the floats 9.

As indicated above, the connecting arrangement between the outer end portions 31" of the arms 31 can be flexible members such as ropes, cables, or the illustrated chains 35 of FIG. 18. The arrangement could also be other ones that allow essentially multi-directional freedom of movement such as the ball 37 and socket 39 design of FIGS. 19-21. Damaging twisting or torque forces are then not developed on the arms 31. Additionally as in the embodiment of FIG. 18, the central section 3' of the flotation platform 3 remains more stable in high wave conditions as the central section 3' is moved about much less regardless of the direction the waves push against the float 9.

Figure 22:
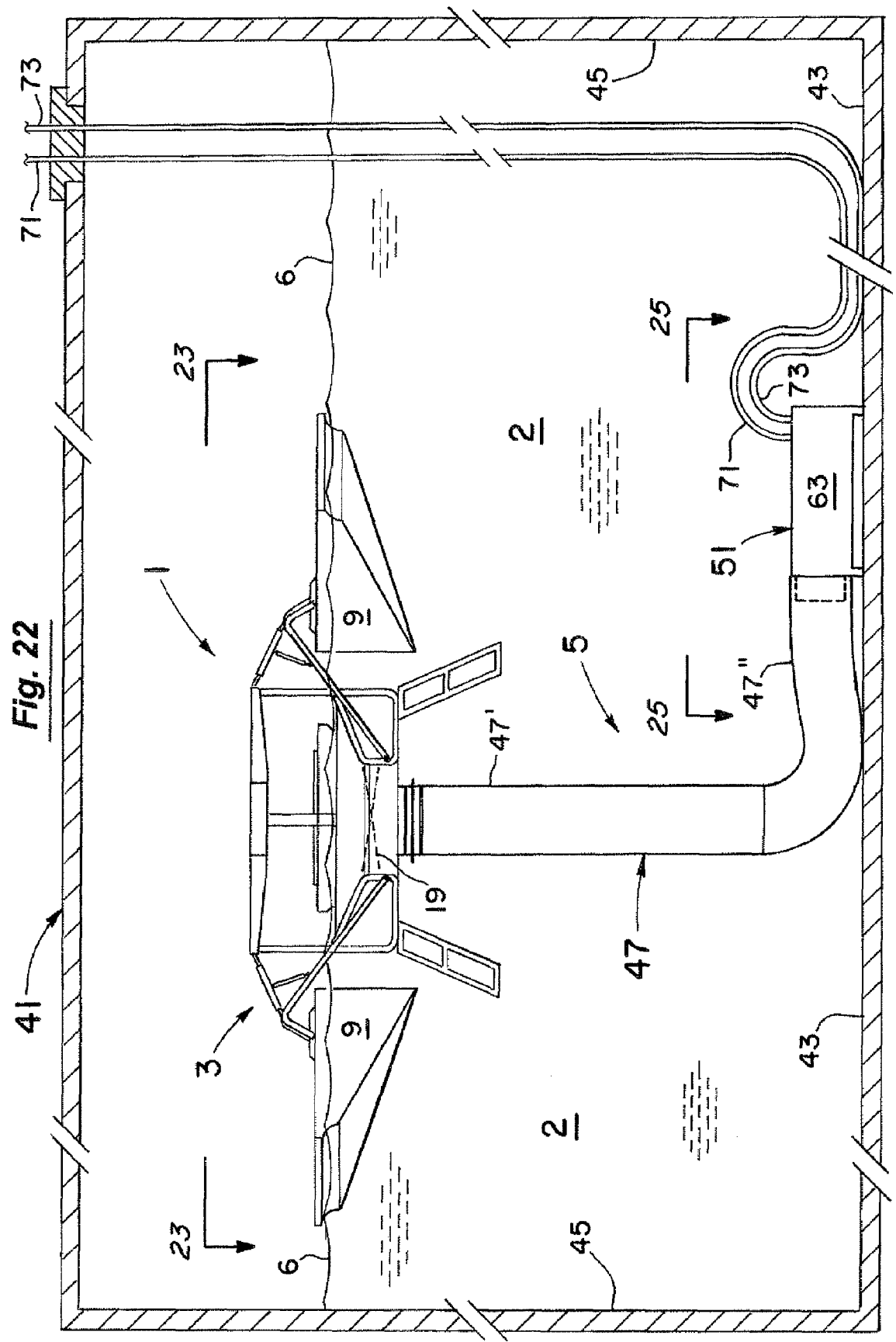
FIG. 22 is a side view of a circulation system adapted for use in municipal or similar tanks of potable water.
Figure 23:
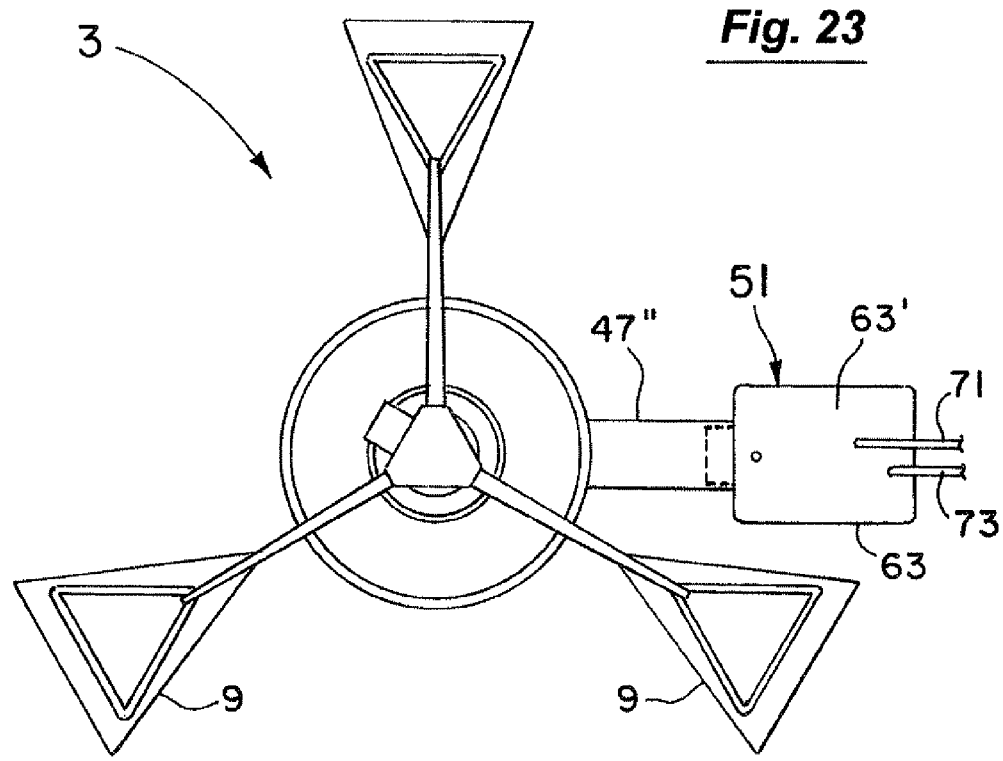
FIG. 23 is a top view thereof taken along line 23-23 of FIG. 22.

FIG. 22 illustrates a circulation system 1 of the present invention specifically adapted for use in a municipal or similar tank 41 or container of potable water 2. The tank 41 as shown has a floor 43 and a wall arrangement 45 extending upwardly therefrom. The system 1 includes a flotation platform 3, draft hose 5, and impeller 19. The draft hose 5 has a tubular main body 47 and a bottom inlet arrangement 51. The main body 47 of the draft hose 5 is flexible about its center line and extends from the flotation platform 3 to the bottom inlet arrangement 51. The main body 47 of the draft hose 5 as shown in FIG. 22 has an upper portion 47' that depends substantially vertically downwardly from the flotation platform 3. The main body 47 also has a lower portion 47" (see also FIG. 23) that extend substantially radially outwardly of the upper portion 47' to the bottom inlet arrangement 51 supported and resting on the tank floor 43.

Figure 24:
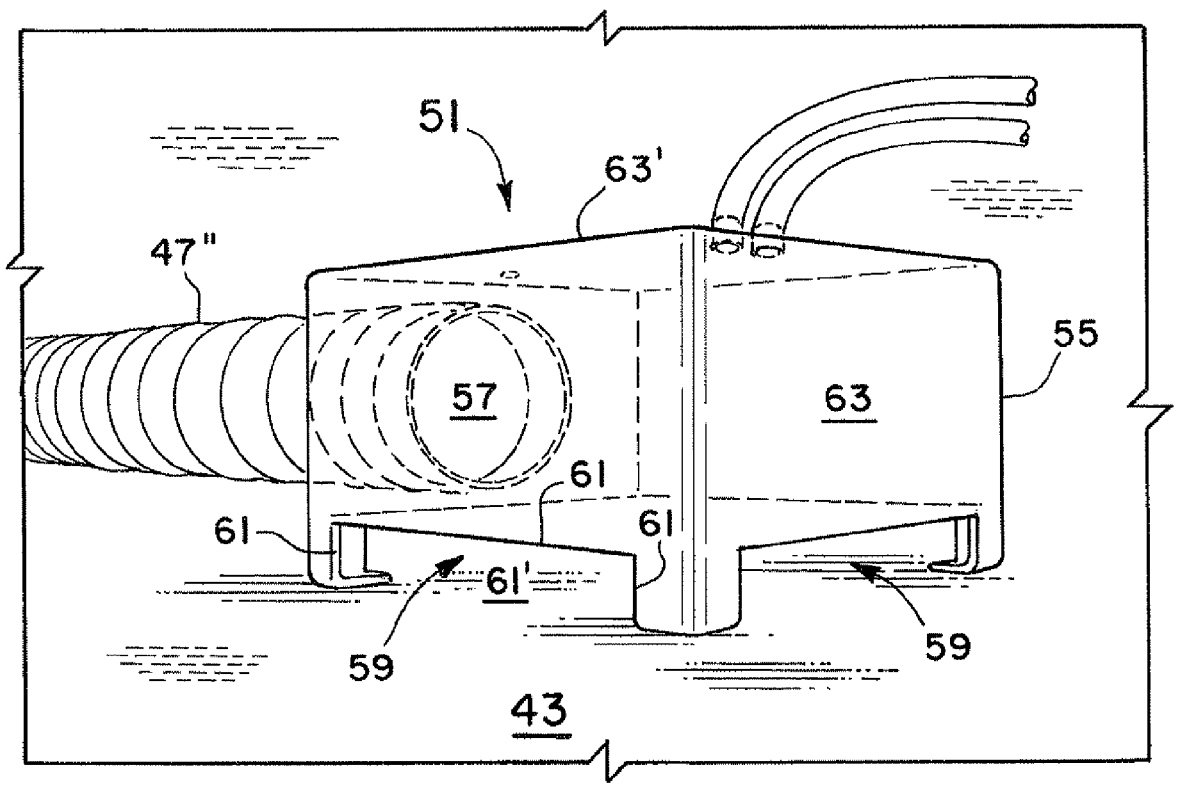
FIG. 24 is a perspective view of the bottom inlet arrangement to the lower portion of the draft hose.
Figure 25:
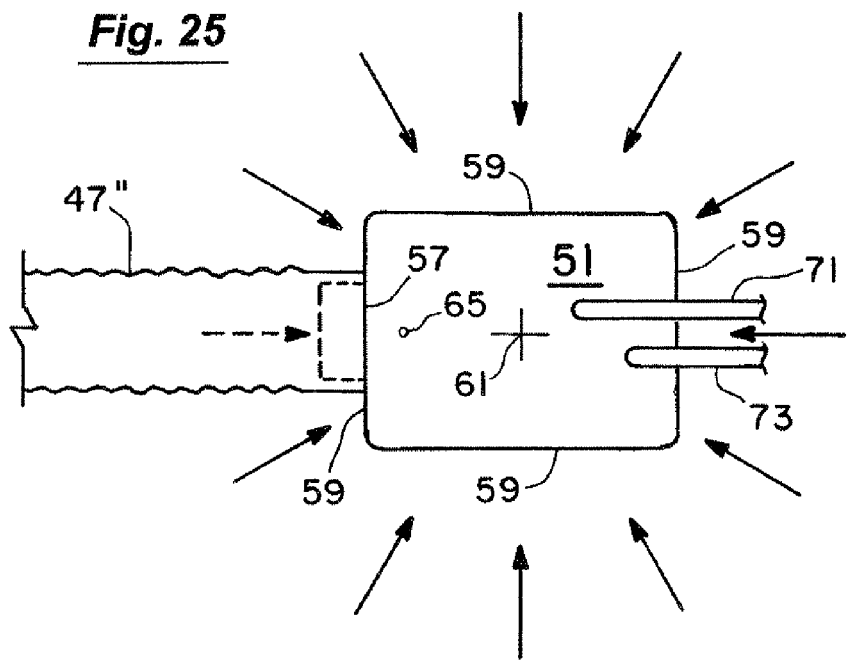
FIG. 25 is a top view of the bottom inlet arrangement taken along line 25-25 of FIG. 22.

The bottom inlet arrangement 51 as illustrated in FIG. 24 has a chamber defined by the box-like housing 55. The outlet 57 of the chamber is in fluid communication with the lower portion 47" of the main body 47 of the draft hose 5. The inlet of slots 59 to the chamber as shown in FIGS. 24 and 25 is substantially open about the substantially vertical axis 61. In this manner, the impeller 19 of FIG. 22 will then draw water into the lower portion 47" of the draft hose 5 via the inlet arrangement 51 (FIG. 24) from adjacent and preferably right off of the tank floor 43. This draw across the tank floor 43 will be substantially radially from all directions (FIG. 25) inwardly toward and substantially 360 degrees about the vertical axis 61 through the inlet of slots 59 of the chamber of the housing 55 and into the lower hose portion 47". The inlet slots 59 in this regard are defined by the sides 61 and 61' (FIG. 24) with the lower side 61' preferably being the tank floor 43. As indicated above, the water is then literally drawn off of the tank floor 43 for a thorough and complete mixing of the water 2 in the tank 41. To enhance this mixing and to aid in maintaining a laminar flow throughout the tank 41, the vertical height of the inlet slots 59 is preferably less than six inches and more preferably on the order of about two to three inches.

The system 1 of FIG. 22 in a manner analogous to FIG. 1 thus establishes a desirable circulation or flow pattern in the tank water 2. The pattern is outwardly of the flotation platform 3 of FIG. 22 along the water surface 6, downwardly along the surface of the wall arrangement 45, inwardly across the tank floor 43 to the bottom inlet arrangement 51 of the draft hose 5, and up the main body 47 of the draft hose 5 back to the flotation platform 3. This is the case regardless of the shape of the tank 41 itself (e.g., cylindrical or rectangular). The circulation in the pattern is preferably slow enough (e.g., 1 ft/sec and preferably about 0.5 ft/sec through the hose main body 47) to maintain a laminar flow throughout the cycle. Although the diameter of the hose 5 can vary (e.g., 12 to 36 inches), the flow volume in a 12 inch hose for example would be on the order of 350 gallons per minute. This circulation pattern then sets up induced flows such as 8 in FIG. 1 outwardly of the hose 5 which combined with the radially outwardly flow on the water surface 6 of FIG. 1 and radially inwardly flow adjacent the lake bottom 4 serve to thoroughly mix the water 2.

Figure 26:
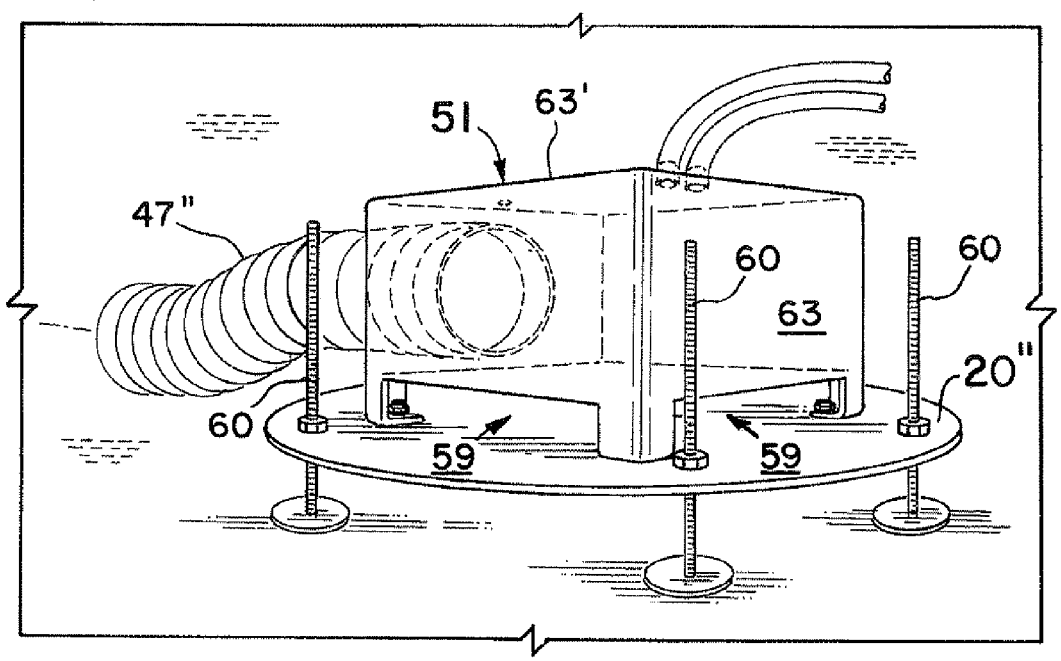
FIGS. 26 and 27 illustrate a modification to the inlet arrangement of FIGS. 22 and 24 wherein the height of the inlet off the floor of the tank can be adjusted if desired.
Figure 27:
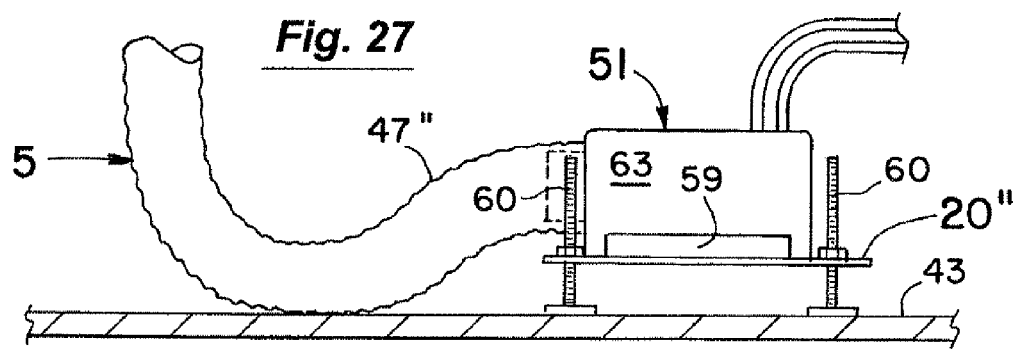

In the embodiment of FIGS. 26 and 27, a substantially horizontal plate 20" is secured (e.g., bolted) below the inlet arrangement 51. The plate 20" is provided with adjustable length legs 60 (e.g., threaded bolts passing through nuts affixed to the plate 20"). With this arrangement, the inlet slots 59 can then be positioned above the tank floor 43 as desired (e.g., one to twelve inches) and a horizontal incoming flow height above the floor 43 set by the plate 20".

Figure 28:
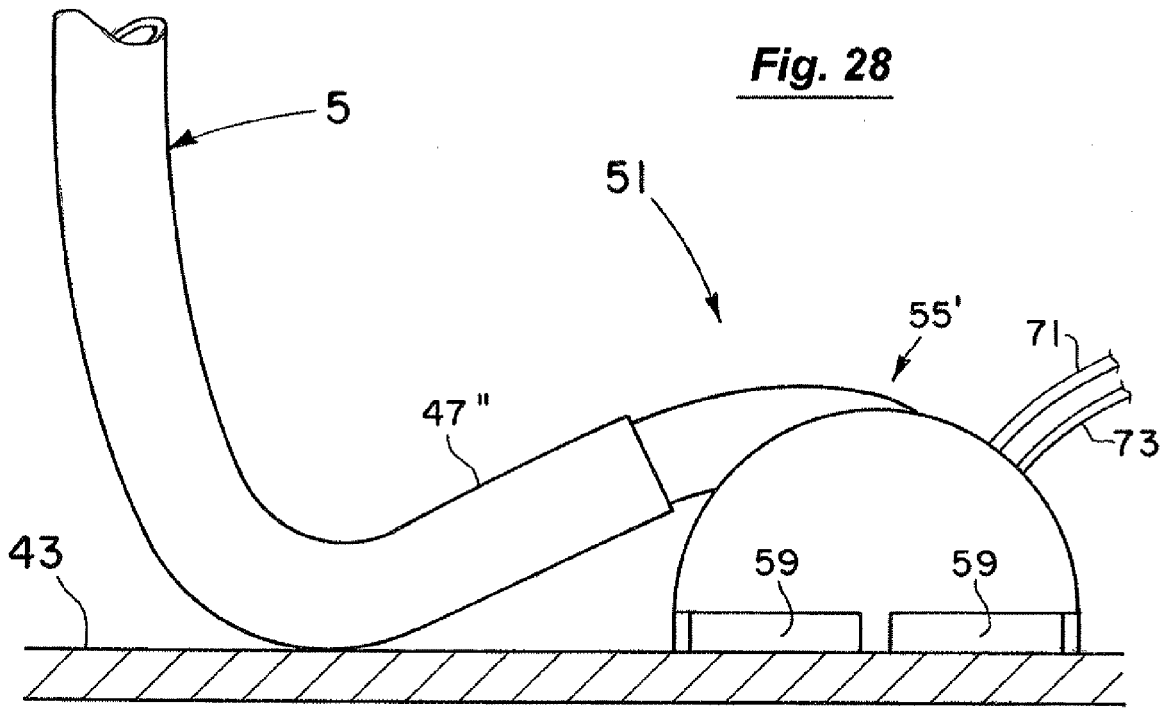
FIG. 28 shows a modified shape of the housing of the bottom inlet arrangement to the draft hose.
Figure 29:
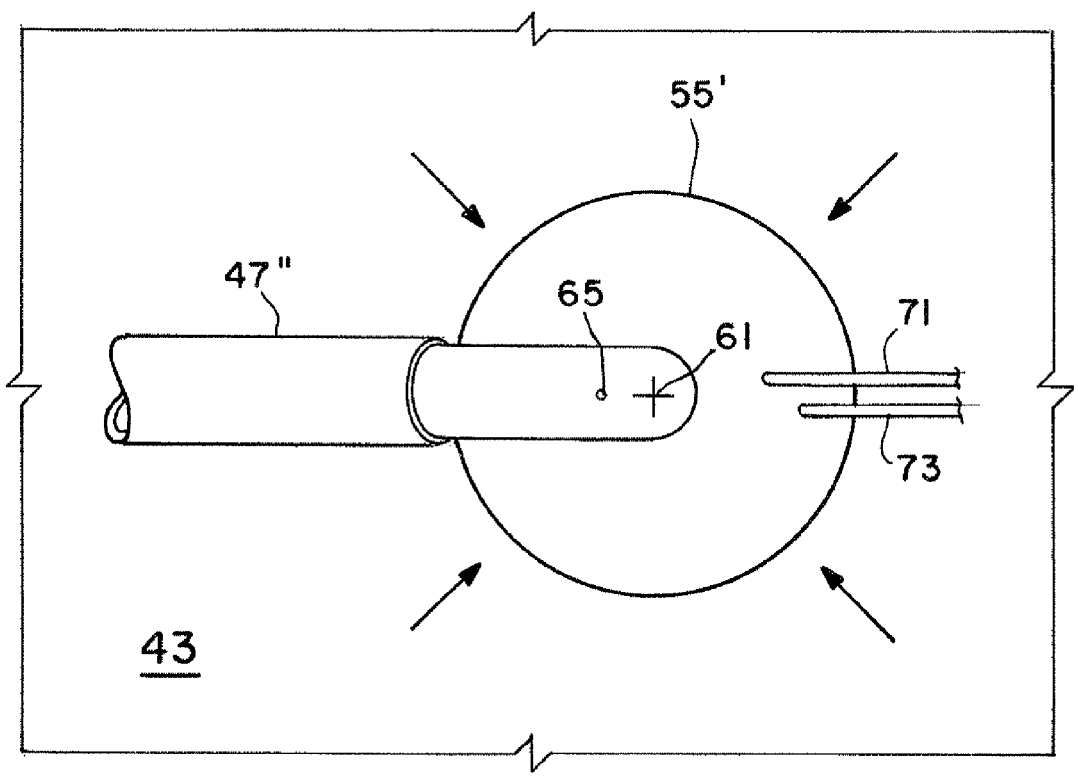
FIG. 29 is a view taken along line 29-29 of FIG. 28.

The housing 55 defining the chamber of the bottom inlet arrangement 51 is shown in FIGS. 22-27 as having flat rectangular or square sides 63 and top 63' but could have other shapes such as the hemispherical or igloo shape 55' of FIGS. 28 and 29. Regardless of the shape, the draw into the chamber of the housing 55 or 55' through the inlet slots 59 is still preferably directed to be from essentially all directions (360 degrees) about the axis 61 as in FIGS. 25 and 29. In some applications, it is noted that the tank floor 43 may be inclined somewhat and the axis 61 therefor offset from a strictly true vertical. However, in most anticipated applications, the axis 61 will still be at least substantially vertical.

In both arrangements of FIGS. 22-29 and as perhaps best seen in FIGS. 25 and 29, one or more air or vent holes 65 are preferably provided to allow any air or other gases entrapped in the inlet arrangement 51 to escape upwardly into the tank water. The vent hole 65 as illustrated is at a high and preferably the highest point of the inlet arrangement 51. In this manner, the vent hole 65 helps to prevent air or gas pockets from developing that might otherwise create forces tending to tip or lift the inlet arrangement 51 off of the tank floor 43. In both arrangements of FIGS. 22-29 and as perhaps best seen in FIGS. 22 and 28, part of the lower portion 47" of the main body of the hose 5 preferably rests on the tank floor 43. As the water level in the tank rises and falls, the length of the radially extending lower portion 47" corresponding shortens and lengthens. The housing 55 or 55' in this regard preferably remains stationary adjacent the lowest point of the tank floor 43 and the flotation platform 3 then drifts horizontally on the water surface 6 accordingly to maintain the overall configuration of FIG. 22.

Another adaptation of the system 1 of FIG. 22 to municipal water tanks 41 and the treatment of drinking or potable water is the inclusion of lines 71 and 73 for the injection of disinfectant(s) or other materials (e.g., chemicals) into the circulating pattern of the water 2. The lines 71 and 73 are in fluid communication with the bottom inlet arrangement 51 and the injection in this regard is preferably directly into the chamber of the housing 55 or 55' of the bottom inlet arrangement 51 as shown. In this manner, the injected disinfectants such as chlorine or chloramines will be quickly and thoroughly mixed in the tank water 2 and maintained so by the circulation system 1.

As indicated above, the system 1 of FIG. 22 establishes a desirable circulation or flow pattern in the tank water 2. The pattern is outwardly of the flotation platform 3 of FIG. 22 along the water surface 6, downwardly along and against the surface of the wall arrangement 45, inwardly across the tank floor 43 to the bottom inlet arrangement 51 of the draft hose 5, and up the main body 47 of the draft hose 5 back to the flotation platform 3. The flow pattern as also indicated above is preferably laminar or at least nearly laminar. The municipal tank water 2 of FIG. 22 is then thoroughly mixed to avoid dead spots and undesirably aged water. The disinfectants or other chemicals added to the water 2 (e.g., through injection lines 71 and 73) are also quickly and uniformly distributed. This can be particularly important in emergencies when it is necessary to rapidly chlorinate the water 2 (often referred to as break-point-chlorination).

The part of the circulation pattern of the present invention actually flowing adjacent or against the surfaces of the wall arrangement 45 and tank floor 43 is equally beneficial in controlling bacteria (e.g., ammonia oxidizing bacteria or nitrifying bacteria) that can cling or attach to the tank walls and floor essentially as a thin film. Such bacteria obtain energy to survive and grow as well as reproduce by converting ammonia into nitrites. Nitrites in turn can be very harmful to humans, even in low concentrations.

The source of the ammonia supporting the bacteria is primarily related to the relatively recent use of chloramines (e.g., 4:1 or higher ratio of liquid chlorine and ammonia) versus just chlorine as in the past. Among other things, chloramines have the benefits of being cheaper, safer to handle for the operators, more stable, and longer lasting than chlorine by itself. The disinfecting process also tends to be slower and creates fewer undesirable by-products than chlorine used alone. Depending upon many factors including the ratio of the chlorine/ammonia and the temperature and pH of the tank water, the ammonia in the mixture safely remains chemically associated with the chlorine and does not become free ammonia to serve as food for the bacteria. Unfortunately, the desired ratio (e.g., 4:1) is always being eroded as the chlorine side is continually being degraded or consumed performing its primary function of cleansing the water. If not closely monitored, the ratio can get out of the desired range and ammonia freed to feed the bacteria leading to the undesirable creation of nitrites. However, such monitoring can be difficult as a check for chlorine levels tells little about the ammonia levels and checking for ammonia levels could show safe levels but misses that it is safe because the dangerous bacteria consumed it making nitrites. Checking for nitrites often indicates a problem but long after it might have been avoided by simply changing the chloramine ratio or doing a rapid addition of chlorine. The preferred solution to the problem as accomplished by the present invention is not to let the bacteria develop in the first place.

That is, the undesirable bacteria not only can cling or attach to the tank walls and floor but also to particles that have settled to the floor. It is believed that a very high percentage of the bacteria (e.g., 85%) are in the very bottom one inch or so of municipal tanks with the remainder (e.g., 15%) clinging to the tank walls or other structural members (e.g., support pillars) inside the tank. Consequently, in past systems, it has been the practice to try to avoid drawing in water from the bottom few inches of the tank by setting the hose inlet at least that high and often one or two feet above the tank floor. The bottom few inches or more are then not part of the circulation pattern and the disinfectant (e.g., chlorine) for the most part does not contact and kill the bacteria. The undesirable bacteria then flourish in the municipal water tank 41.

This is turn can lead to the need in extreme cases to shut down the tank for decontamination once the level of nitrites becomes unsafe or to rapidly chlorinate the water 2 (breakpoint-chlorination) as for example by adding chlorine through one of the lines 71, 73. Both of which actions are undesirable and often ineffective solutions. However, because of the circulation or flow pattern of the system 1 of FIG. 22, chlorinated water is passed by and against the surface of the wall arrangement 45 and across the surface of the tank floor 43 to contact and kill the bacteria. Where bacteria already exists in a tank, the present system 1 essentially skims across the film of bacteria killing and removing a thin layer at a time until it is all gone leaving a clean surface. In some applications in this regard, it may be desirable to use the adjustable height embodiment of FIGS. 26 and 27 in existing tanks with large sediment or bacteria build up on the tank floor to more gradually flush or clean away the build up. The inlet arrangement 51 can then be progressively lowered until the plate 20" essentially rests directly on the floor 43 itself to maintain the entire tank clean. With such methods, the ammonia oxidizing bacteria can be removed and/or prevented or at least inhibited from growing.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A circulation system for a body of water in a tank having a floor and a wall arrangement extending upwardly therefrom to contain the body of water, said system including a flotation platform, an impeller, and a draft hose with a main body and a bottom inlet arrangement supported on the tank floor, said main body of said draft hose being flexible and extending from said flotation platform to said bottom inlet arrangement, said main body having an upper portion depending substantially vertically downwardly from the flotation platform and a lower portion extending substantially radially outwardly of said upper portion to the bottom inlet arrangement supported on the tank floor, said bottom inlet arrangement having a chamber with an outlet in fluid communication with the lower portion of the draft hose and an inlet substantially open about a substantially vertical axis, said impeller drawing water adjacent the tank floor substantially radially inwardly along said tank floor toward and from substantially 360 degrees about said vertical axis, into the inlet of said chamber, and up through the main body of the draft hose to the flotation platform.

2. The system of claim 1 wherein the inlet of the chamber is defined by sides with said tank floor substantially defining one side wherein the water is drawn substantially off of the tank floor into said inlet.

3. The system of claim 2 wherein the inlet to the chamber defined by said sides extends upwardly from the tank floor for less than about six inches.

4. The system of claim 3 wherein the inlet to the chamber defined by said sides extends upwardly from the tank floor for about two to three inches.

5. The system of claim 1 wherein said chamber is defined by a housing with substantially flat sides and top.

6. The system of claim 1 wherein said housing has a substantially flat top with at least one vent hole therein.

7. The system of claim 1 wherein said chamber is defined by a housing with a substantially hemispherical shape.

8. The system of claim 1 wherein said bottom inlet arrangement has at least one vent hole therein substantially at a high point of the inlet arrangement to allow gas in the inlet arrangement to escape upwardly into the water of the tank.

9. The system of claim 1 wherein a circulation pattern is created in the body of water by the system outwardly of the flotation platform along the surface of the body of water down the wall arrangement inwardly across the tank floor to the bottom inlet arrangement of the draft hose and up the draft hose back to the flotation platform.

10. The system of claim 9 wherein the circulation pattern created in the body of water is substantially laminar flow.

11. The system of claim 1 further including a substantially horizontal plate secured below the inlet arrangement and having adjustable length legs extending downwardly therefrom.

12. The system of claim 1 further including at least one line in fluid communication with the chamber of said bottom inlet arrangement to inject disinfectant into said chamber and the water being drawn therethrough into the lower portion of the draft hose.

13. The system of claim 12 wherein said disinfectant includes chlorine.

14. The system of claim 12 wherein said disinfectant includes chloramines of chlorine and ammonia.

15. The system of claim 12 including at least a second line in fluid communication with the chamber of said bottom inlet arrangement to inject a fluid into said chamber and the water being drawn therethrough into the lower portion of the draft hose.

* * * * *